US012332611B2

(12) United States Patent
Herscovici et al.

(10) Patent No.: US 12,332,611 B2
(45) Date of Patent: Jun. 17, 2025

(54) VIDEO ANALYSIS-BASED ALGORITHM FOR TRIGGERING POWER CUTBACK IN VACUUM ARC REMELTING

(71) Applicant: TITANIUM METALS CORPORATION, Henderson, NV (US)

(72) Inventors: Nir Herscovici, Las Vegas, NV (US); Ashish D. Patel, Wyomissing, PA (US)

(73) Assignee: TITANIUM METALS CORPORATION, Henderson, NV (US)

( * ) Notice: Subject to any disclaimer, the term of this patent is extended or adjusted under 35 U.S.C. 154(b) by 315 days.

(21) Appl. No.: 17/731,753

(22) Filed: Apr. 28, 2022

(65) Prior Publication Data

US 2022/0350294 A1 Nov. 3, 2022

Related U.S. Application Data

(60) Provisional application No. 63/180,961, filed on Apr. 28, 2021.

(51) Int. Cl.
*G05B 13/02* (2006.01)
*C22B 9/04* (2006.01)
(Continued)

(52) U.S. Cl.
CPC ............. *G05B 13/026* (2013.01); *C22B 9/04* (2013.01); *C22B 9/20* (2013.01); *G05B 13/024* (2013.01);
(Continued)

(58) Field of Classification Search
CPC ....... C22B 9/04; C22B 9/20; F27D 2021/026; F27D 11/08; G05B 13/026;
(Continued)

(56) References Cited

U.S. PATENT DOCUMENTS 4,435,818 A * 3/1984 Stenzel ............... C22B 9/20
373/70
6,115,404 A * 9/2000 Bertram ............. H05B 7/152
373/105

(Continued)

FOREIGN PATENT DOCUMENTS

JP 2011158114 A 8/2011
JP 5620684 B2 * 11/2014

OTHER PUBLICATIONS

Cibula, et al., Feedback-Based Control Over the Spatio-Temporal Distribution of Arcs During Vacuum Arc Remelting via Externally Applied Magnetic Fields, Metallurgical and Material Transactions B, Sep. 28, 2020, vol. 51B, pp. 2483-2491, The Mineral, Metals & Materials Society and ASM International 2020.

(Continued)

*Primary Examiner* — Vincent H Tran
(74) *Attorney, Agent, or Firm* — Burris Law, PLLC

(57) ABSTRACT

A control system includes a vision system including an imaging device and a VAR monitoring system configured to determine a power adjustment phase of the VAR process based on the images from the vision system and a process parameter. The VAR monitoring system includes a vision analysis module configured to analyze the images from the vision system to detect a melt marker based on a remelt image process model, and a prediction module configured to predict an operational characteristic of the VAR process that is associated with the power adjustment relative to a melt marker location and a remelt prediction model. The VAR monitoring system is configured to initiate the power adjustment phase in response to the melt marker satisfying a predetermined melt marker condition, the operational characteristic of the VAR process satisfying a predetermined operational condition, or a combination thereof.

19 Claims, 5 Drawing Sheets

(51) Int. Cl.
  *C22B 9/20* (2006.01)
  *G06T 7/00* (2017.01)
(52) U.S. Cl.
  CPC .. *G06T 7/0004* (2013.01); *G06T 2207/20084* (2013.01); *G06T 2207/30136* (2013.01); *G06T 2207/30204* (2013.01)
(58) Field of Classification Search
  CPC ............ G06T 2207/30136; H05B 7/07; H05B 7/144; H05B 7/20
  See application file for complete search history.

(56) References Cited

U.S. PATENT DOCUMENTS

| | | | |
|---|---|---|---|
| 6,804,582 B1 | 10/2004 | Gerhan | |
| 9,220,131 B1* | 12/2015 | Williamson | ........... H05B 7/148 |
| 10,591,217 B2 | 3/2020 | Underys | |
| 2014/0044145 A1* | 2/2014 | Williamson | ........... H05B 7/148 |
| | | | 373/49 |
| 2015/0308747 A1 | 10/2015 | Williamson et al. | |
| 2020/0027206 A1* | 1/2020 | Szarski | ................. G06T 7/0004 |

OTHER PUBLICATIONS

Rigel Woodside, et al., A Measurement System for Determining the Positions of Arcs During Vacuum Arc Remelting, pp. 452-457, 2010, IEEE.

Gerasimov, et al., Vacuum Arc Furnace for the Production of Composite Ingots, Russian Metallurgy (Metally), pp. 940-944, vol. 2014, No. 12, Dec. 2, 2013.

International Search Report issued in corresponding International Application PCT/US2022/026741, mailed Sep. 20, 2022.

* cited by examiner

VIDEO ANALYSIS-BASED ALGORITHM FOR TRIGGERING POWER CUTBACK IN VACUUM ARC REMELTING

CROSS-REFERENCE TO RELATED APPLICATIONS

This application claims priority to and the benefit of U.S. Provisional Application 63/180,961 filed on Apr. 28, 2021. The disclosure of the above application is incorporated herein by reference.

FIELD

The present disclosure relates to systems and methods for monitoring a vacuum arc remelting (VAR) process in the production of metal ingots.

BACKGROUND

The statements in this section merely provide background information related to the present disclosure and may not constitute prior art.

A vacuum arc remelting (VAR) process is generally used in the processing of high-performance titanium, zirconium, nickel-based alloys, and steel, among other alloys. Generally, a VAR system gradually melts an electrode by an electric current that flows through the electrode and arcs to molten metal contained within a crucible. The applied melting current is varied during the process to achieve the desired molten metal pool geometry and ingot quality.

A VAR system generally performs the VAR process in accordance with an electric power control routine. An example electric power control routine includes ramping electric power to a defined power output, providing the defined power output to the electrode for a given period of time, and gradually reducing the electric power provided to the electrode after the given period of time elapses. However, quality issues may arise when the electric power is reduced too soon or too late.

SUMMARY

This section provides a general summary of the disclosure and is not a comprehensive disclosure of its full scope or all of its features.

In one form of the present disclosure, a control system for a vacuum arc remelting (VAR) process is provided. The control system includes a vision system including an imaging device. The imaging device is configured to capture one or more images of an electrode within a vacuum chamber of the VAR process. The control system also includes a VAR monitoring system configured to determine a power adjustment phase of the VAR process based on the one or more images from the vision system and a process parameter. The VAR monitoring system includes a vision analysis module configured to analyze the one or more images from the vision system to detect a melt marker based on a remelt image process model, and a prediction module configured to predict an operational characteristic of the VAR process that is associated with the power adjustment phase based on the process parameter and a remelt prediction model. The VAR monitoring system is configured to initiate the power adjustment phase in response to the melt marker satisfying a predetermined melt marker condition, the operational characteristic of the VAR process satisfying a predetermined operational condition, or a combination thereof.

In some forms, the melt marker includes a pin, a slot, or a combination thereof.

In one form, the process parameter includes a heat number, an electrode weight, a crucible identification, a furnace number, a furnace current, a furnace voltage, a furnace ram position, or a combination thereof.

In yet another form, for a respective image, the vision analysis module is configured to select a section of the respective image to be analyzed by the remelt image process model.

In still another form, the vision system and the VAR monitoring system begins operating in response to a furnace ram position being at a defined position, a power input to a furnace of the VAR process being greater than a power setpoint, or a combination thereof.

In one form, the remelt prediction model is configured to predict a furnace ram position of the VAR process relative to the melt marker location.

In some forms, the control system further includes a primary VAR controller configured to control power to a furnace of the VAR process. The VAR monitoring system is further configured to initiate the power adjustment phase by notifying the primary VAR controller to begin a power ramp down.

In one form of the present disclosure, a method for a vacuum arc remelting (VAR) process is provided. The method includes obtaining one or more images of an electrode within a vacuum chamber; analyzing the one or more images to detect a melt marker of the one or more images based on a remelt image process model; determining a power adjustment phase of a VAR process based on the one or more images and a process parameter; predicting an operational characteristic of the VAR process based on the process parameter and a remelt prediction model; and initiating the power adjustment phase in response to the melt marker satisfying a predetermined melt marker condition, the operational characteristic of the VAR process satisfying a predetermined operational condition, or a combination thereof.

In some forms, the melt marker includes a pin, a slot, or a combination thereof.

In one form, the process parameter includes a heat number, an electrode weight, a crucible identification, a furnace number, a furnace current, a furnace voltage, a furnace ram position, or a combination thereof.

In another form, the method further includes selecting a section of a respective image to be analyzed by the remelt image process model.

In yet another form, the method further includes operating, in response to a furnace ram position being at a defined position, a power input to a furnace of the VAR process being greater than a power setpoint, or a combination thereof.

In still another form, the method further includes predicting a furnace ram position of the VAR process relative to the melt marker location.

In one form, initiating the power adjustment phase further includes beginning a power ramp down routine.

In some forms, the predetermined operational condition includes determining whether a predicted furnace ram position of the electrode corresponds to a current furnace ram position.

In still another form, the remelt image process model further includes performing one or more image-processing routines to detect the melt marker using a deep convolutional neural network.

In yet another form, the remelt prediction model further includes predicting, using a regression routine, the operational characteristic based on one or more previously obtained process parameters associated with one or more previous VAR processes.

In one form of the present disclosure, a system is provided. The system includes a processor and a nontransitory computer-readable medium including instructions that are executable by the processor. The instructions include: obtaining one or more images of an electrode within a vacuum chamber; analyzing the one or more images to detect a melt marker of the one or more images based on a remelt image process model; determining a power adjustment phase of the VAR process based on the one or more images and a process parameter; predicting an operational characteristic of the VAR process based on the process parameter and a remelt prediction model; and initiating the power adjustment phase in response to the melt marker satisfying a predetermined melt marker condition, the operational characteristic of the VAR process satisfying a predetermined operational condition, or a combination thereof.

In one form, the remelt image process model further includes instructions for performing one or more image-processing routines to detect the melt marker using a deep convolutional neural network.

In another form, the remelt prediction model further includes instructions for predicting, using a regression routine, the operational characteristic based on one or more previously obtained process parameters associated with one or more previous VAR processes.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
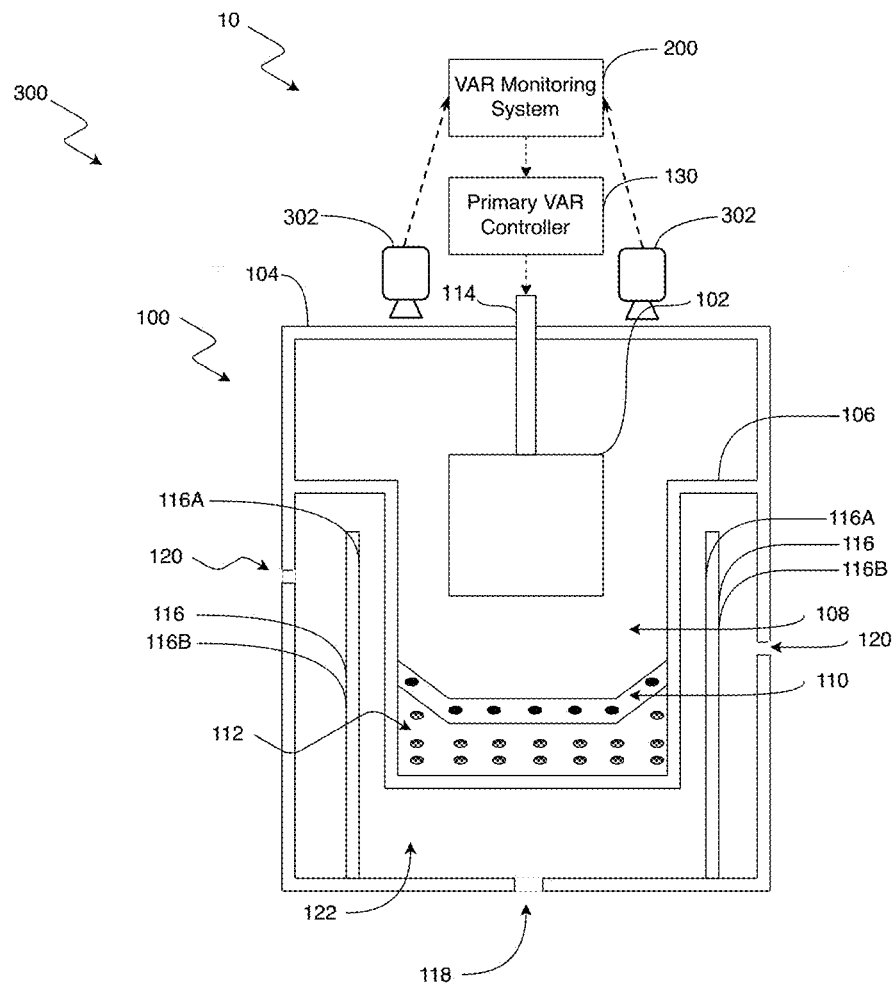
FIG. 1 is a schematic view illustrating a vacuum arc remelting (VAR) system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a control system for a vacuum arc remelting (VAR) process that includes a VAR monitoring system employing two detection schemes for identifying when a power adjustment (i.e., power cut-back) phase of the VAR process is to commence. Specifically, for the first detection scheme, the VAR monitoring system uses a remelt image process model to analyze images from a vision system and to determine whether a melt marker satisfies a predetermined melt marker condition. For the second detection scheme, the VAR monitoring system predicts an operational characteristic of the VAR process based on a process parameter and a remelt prediction model. The VAR monitoring system initiates the power adjustment phase in response to the melt marker satisfying the predetermined melt marker condition, the operational characteristic of the VAR process satisfying a predetermined operational condition, or a combination thereof. Once detected, the VAR monitoring system instructs a primary VAR controller to begin the power adjustment phase to gradually reduce power to the electrode. Accordingly, the control system having the VAR monitoring system of the present disclosure accurately transitions to the power cutback phase without relying on manual detection and/or operation.

One advantage of the present disclosure is to automatically control a power adjustment phase of a VAR process based on remelt image data from a vision system and a process parameter. By automatically controlling the power adjustment phase of the VAR process to the electrode, the quality of ingot melt of the VAR process improves. Furthermore, the VAR process described herein inhibits or reduces material waste (e.g., electrode/melted ingot waste) while improving ingot productivity, furnace equipment utilization, and cost-effectiveness of producing consistent, high-quality ingot melts.

Referring to FIG. 1, a VAR system 10 includes a furnace 100, a primary VAR controller 130, a VAR monitoring system 200, and a vision system 300. The furnace 100 heat an electrode 102 and, in one form, a housing 104 and a crucible 106 that defines a vacuum chamber 108. The electrode 102 may be formed of various electrically conductive materials that are suitable for a VAR process, such as titanium, zirconium, nickel-based alloys, and steel, among other alloys. The crucible 106 may be formed of various materials suitable for a VAR process, such as copper.

In one form, the furnace 100 may be configured to perform a VAR process and gradually melt the electrode 102 to form an ingot 110, which includes a pool of molten metal 112. During the VAR process, the primary VAR controller 130 is configured to lower an electrode ram 114 to vertically position the electrode 102 proximate to (e.g., adjacent and/or near) the pool of molten metal 112 (e.g., an ingot melt). When a furnace ram position of the electrode ram 114 (e.g., a vertical position of one or more ends of the electrode ram 114 within the vacuum chamber 108) indicates the electrode 102 is proximate the pool of molten metal 112, the primary VAR controller 130 is configured to provide electrical power to the electrode 102 to generate electrical arcs within the vacuum chamber 108. In some forms, the electrical arcs are configured to form a continuous melt between the electrode 102 and the pool of molten metal 112. To perform the functionality described herein, the primary VAR controller 130, which is coupled to an electric power supply (not shown), may include driver circuits, actuators, switches, power converters, and/or other suitable electronic components for providing electric power to the electrode 102 and for adjusting the position of the electrode 102 within the crucible 106.

In one form, the furnace 100 also includes one or more suitable sensors and/or electrical hardware (not shown) for obtaining process parameters, such as the physical properties of the electrode 102 and/or the electrical characteristics, which are described in greater detail below. In one form, the furnace 100 includes coolant guides 116, a coolant inlet 118, coolant outlets 120, and a coolant chamber 122 defined by an outer wall of the vacuum chamber 108 and an inner wall of the housing 104. In one form, coolant (e.g., water) is provided into the coolant chamber 122 via the coolant inlet 118 to reduce the temperature of the crucible 106. The coolant exits the coolant chamber 122 via the coolant outlets 120 as it flows upward on an inner side 116A of the coolant guides 116 and downwards on an outer side 116B of the coolant guides. It should be understood that other systems for cooling the crucible 106, such as forced air systems, may be provided and are not limited to the example described herein.

In one form, the primary VAR controller 130 is configured to provide electric power to the electrode 102 in accordance with an electric power control routine. As an example, the primary VAR controller 130 initially ramps the electric power to a steady state power (e.g., a predefined steady state current and/or voltage value) and then provides the steady state power to the electrode 102. Furthermore, the primary VAR controller 130 is configured to ramp down the electric power from the steady state power to zero in response to receiving a notification from the VAR monitoring system 200 to initiate a power adjustment phase, as described below in further detail.

The vision system 300 includes imaging devices 302 arranged to capture images of the electrode 102 within the crucible 106. The imaging devices 302 may include, but are not limited to, a two-dimensional camera and a three-dimensional camera. In one form, the imaging devices 302 include one or more serial digital interface (SDI) output connections. In one form, the SDI output connections provide a locking feature to enable connecting interface cables to lock into place and enable image data to be transmitted over long distances (e.g., up to 300 feet). While example imaging devices 302 may be positioned in a downward direction and vertically positioned to face the electrode 102B, it should be understood by one of ordinary skill in the art that the camera can have varying positions and orientations and is not limited to the examples described and illustrated herein.

Figure 2B:
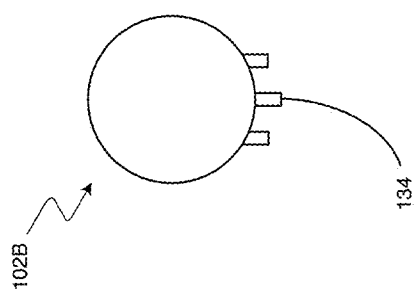
FIG. 2B is a top view of one or more pins of an electrode in accordance with the teachings of the present disclosure.
Figure 2A:
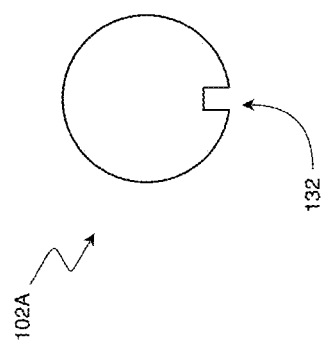
FIG. 2A is a top view of a slot of an electrode in accordance with the teachings of the present disclosure.

In one form, the imaging devices 302 are configured to capture images of an end portion of the electrode 102 to capture images of one or more melt markers. As used herein, "melt marker" refers to a predetermined feature of the electrode 102 used to initiate the power adjustment phase. As an example and referring to FIGS. 2A-2B, the melt markers include a slot 132 of the electrode 102A, and/or a pin 134 of the electrode 102B. It should be understood that the melt marker may include other features of the electrodes 102A, 102B and is not limited to the examples described herein. While example pins and slots are shown, it should be understood by one of ordinary skill in the art that the pins and slots may have varying shapes, geometry, and sizes and are not limited to the examples described and illustrated herein.

In one form, the predetermined melt marker condition includes an open or a closed slot of the electrode, or an end of a melt marker. In one example, the end of the melt marker includes an absence of the pin 134 of the electrode.

The VAR monitoring system 200 initiates the power adjustment phase based on images from the vision system 300 and/or a process parameter of the furnace 100. Specifically, the VAR monitoring system 200 is configured to perform image processing routines on the captured images to detect the melt markers and determine whether the melt marker satisfies a predetermined melt marker condition. In one form, the melt marker satisfies the predetermined melt marker condition when the VAR system 200 detects that the pins 134 and/or the slots 132 have a predetermined geometry, area, orientation, size and/or size. In one example, the predetermined melt marker condition indicates an end of melt marker exists or an absence of the pins. In another example, the predetermined melt marker condition indicates an open slot exists. The VAR monitoring system 200 initiates the power adjustment phase if the predetermined melt marker condition exists. In addition, the VAR monitoring system 200 is configured to predict an operational characteristic of the VAR process based on the process parameter and initiates the power adjustment phase in response to the operational characteristic satisfying a predetermined operational condition. Example process parameters include, but are not limited to: a heat number, physical properties of the electrode 102 (e.g., an electrode weight, an electrode material, a melt marker location, a position of a lower surface of an electrode, etc.), physical properties of an ingot melt (e.g., a height of the ingot melt), an identification number (e.g., an identification number of the crucible 106, an identification number of the furnace 100, or a combination thereof), electrical characteristics (e.g., a voltage and/or current provided to the furnace 100 via the electrode 102), an arc region (e.g., a gap between the lower surface of the electrode and the ingot melt) and/or a furnace ram position of the electrode 102. Additional details regarding the predetermined operational condition are provided below.

Figure 3:
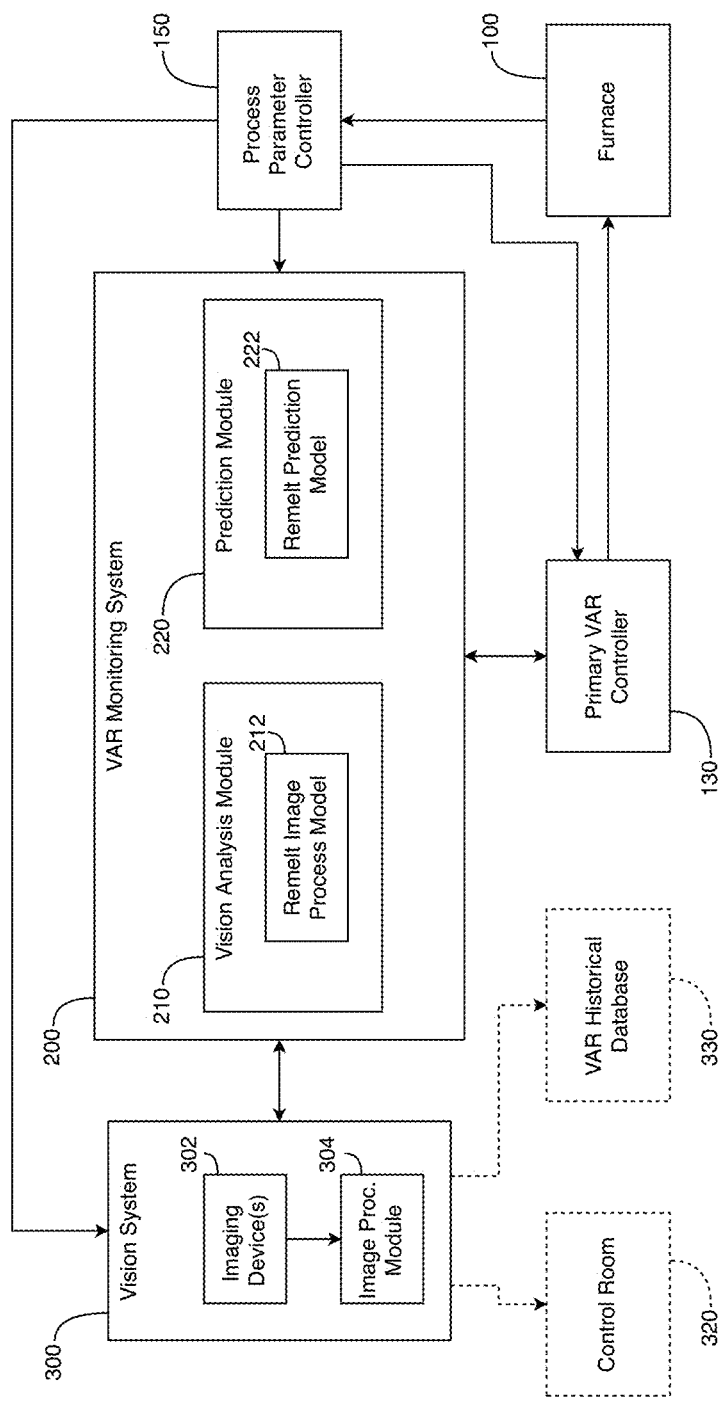
FIG. 3 is a functional block diagram of the VAR system in accordance with the teachings of the present disclosure.

Referring to FIG. 3, a functional block diagram of the VAR system 10 having the furnace 100, the primary VAR controller 130, the VAR monitoring system 200, and the vision system 300 is provided. In one form, the VAR system 10 further includes a process parameter controller 150, a control room 320, and a VAR historical database 330. It should be readily understood that any one of the components of the VAR system 10 can be provided at the same location or distributed at different locations (e.g., via one or more edge computing devices) and communicably coupled accordingly. In one form, the furnace 100, the primary VAR controller 130, the process parameter controller 150, the VAR monitoring system 200, the vision system 300, the control room 320, and the VAR historical database 330 are communicably coupled using a wired and/or wireless communication protocol (e.g., a Bluetooth®-type protocol, a cellular protocol, a wireless fidelity (Wi-Fi)-type protocol, a near-field communication (NFC) protocol, an ultra-wide-band (UWB) protocol, among others).

In one form, the process parameter controller 150 obtains the process parameters of the furnace 100 and selectively provides the process parameters and/or control signals to the vision system 300, the VAR monitoring system 200, and/or the primary VAR controller 130. As an example, the process parameter controller 150 provides a control signal to the vision system 300 and the VAR monitoring system 200 when at least one of the following occurs: the furnace ram position of the electrode 102 is at a defined position, a power input to the furnace 100 via the electrode 102 is greater than a power setpoint, and/or a weight of the electrode 102 is at a defined weight limit. In one form, the control signal may instruct the vision system 300 and the VAR monitoring system 200 to initiate the vision analysis routines, operational characteristic prediction routines, and/or the power adjustment phase routines described herein.

In one form, the vision system 300 includes the imaging devices 302 and an image processing module 304. The image processing module 304 is configured to partition the image data obtained from the imaging devices 302 into one or more frames and convert the image data into a pixel format that is compatible with the VAR monitoring system 200. Optionally, in some forms, the image processing module 304 provides partitioned and converted image data (hereinafter referred to as "processed image data") to one or more display/computing devices located in the control room 320 and/or the VAR historical database 330 for additional processing.

In one form, the VAR monitoring system 200 includes a vision analysis module 210 and a prediction module 220. In one form, the vision analysis module 210 is configured to analyze the processed image data from the vision system 300 to detect the melt marker based on a remelt image process model 212. As an example, the remelt image process model 212 is a deep convolutional neural network configured to perform various image-processing routines to detect the melt markers. Specifically, the remelt image process model 212 may include one or more convolutional layers defined by any suitable combination of parameters including, but not limited to: kernel dimensions, number of kernels, stride values, padding values, input/output channels, bit depths, feature map widths/lengths, and rectified linear unit (ReLU) activation layers. Furthermore, the remelt image process model 212 may include residual layers, downsampling layers, flattening layers, and other convolutional neural network layers for analyzing the images from the vision system 300. It should also be understood that the remelt image process model 212 may be trained in accordance with various known training routines, and the description of various training routines is omitted from the description for brevity. In one form, the remelt image process model 212 is configured to perform a semantic-based image processing routine on the processed image data from the vision system 300. As an example, the remelt image process model 212 includes one or more reference images of the electrode 102 that are semantically labeled with the melt markers (e.g., the slot 132 and/or the pins 134) while training the remelt image process model 212. In one form, the one or more reference images of the electrode 102 may include one or more images having the same and/or different image quality. The image quality may include one or more variations of orientations, distortions, sharpness, vignetting, noise, brightness, dynamic-range, color accuracy, flare, uniformity, lateral chromatic aberration, or the like. In one form, the reference images of the electrode 102 include one or more orientations and/or one or more angles of the electrode 102. In one example, the reference images include approximately 10,000 images, where each image identifies its respective melt markers and respective melt marker condition, such as identifying a presence of the pins, and whether respective pins include an end of the pin or an absence of the pin. In another example, the reference images include approximately 10,000 images, where each image identifies its respective melt markers and respective melt marker condition, such as identifying a presence of slots and whether a respective slot is an open slot or a closed slot.

Figure 4:
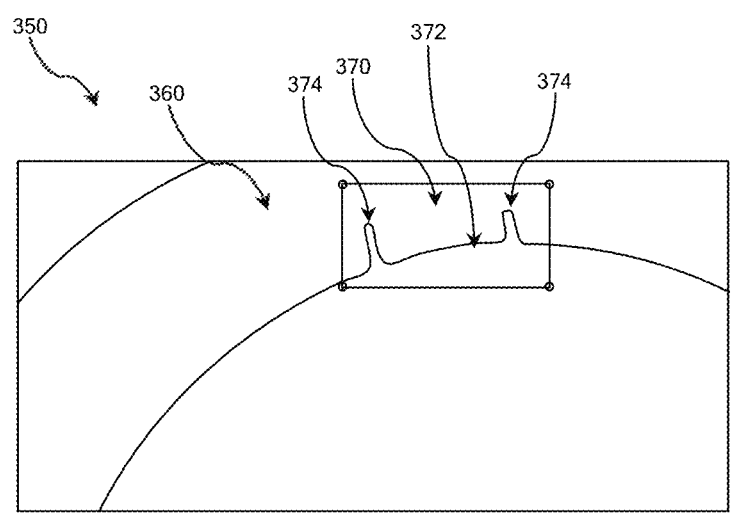
FIG. 4 is an example of a selected section of an image identified by the VAR system in accordance with the teachings of the present disclosure.

Accordingly, the remelt image process model 212 may perform a semantic-based image processing routine based on the processed image data and compare the classified objects to the melt markers of the reference images to detect the melt markers of the processed image data. It should be understood that the remelt image process model 212 may perform other image processing routines (e.g., a difference-based image processing routine) and is not limited to the examples described herein. In one form, the vision analysis module 210 is configured to select a section of the respective images to be analyzed by the remelt image process model 212. In one form, the vision analysis module 210 may be configured to filter the processed image data such that the remelt image process model 212 analyzes pixels associated with contours/edges of the electrode 102 and/or brightness/color transitions of the processed image data. As an example and as shown in FIG. 4, the vision analysis module 210 filters/removes section 360 of image 350 and selects section 370 to be analyzed based on the section 370 having both a nominal pixel contour 372 representing an edge of the electrode 102 and one or more protruding pixel regions 374 representing one or more potential pins 134 of the electrode 102.

In another form, the remelt image process model is configured to select the section of the respective image to be analyzed by the remelt image process model 212 using a bounding box regression model. In one example, the vision analysis module 210 may be configured to perform object localization to select the section of the respective images to be analyzed by the remelt image process model 212. The bounding regression model is trained using a loss function such as mean-squared error or mean absolute error on the reference images and a bounding box of the melt markers in each image of the reference images. The bounding box includes at least two bounding box coordinates, such as a top-left (x,y) coordinate and a bottom-right (x,y) coordinate. The vision analysis module predicts, using the bounding box regression model, the bounding box coordinates to define the bounding box. A predicted bounding box corresponds to a selected section of each image of the respective images to be analyzed by the remelt image process model 212. In some variations, the vision analysis module 212 is configured to provide data regarding the location of the bounding box related to the image and provide the data to the vision system 300, which may then provide a digital representation of the bounding box on the images of the VAR process being displayed by a monitor in the control room 320. Accordingly, technicians viewing the VAR process are notified of the section of the electrode 102 that is predicted to have the melt markers.

In one form, the vision analysis module 210 is configured to generate a confidence score associated with the images indicating whether the processed image data from the vision system 300 includes the melt markers. As an example, the convolutional neural network may output a predictive distribution indicating a probability that a melt marker was accurately detected and/or whether the detected melt marker satisfies the predetermined melt marker condition by the remelt image process model 212 (e.g., a delta method-based prediction interval, a Bayesian method-based prediction interval, or a mean variance estimation-based interval). If the prediction distribution value is greater than a threshold value, the vision analysis module 210 determines that the melt markers satisfy the predetermined melt marker condition. Furthermore, once the melt markers satisfy the predetermined melt marker condition, the VAR monitoring system 200 broadcasts a notification to the primary VAR controller 130 to initiate the power adjustment phase to ramp down the electric power from the steady state power to a lower power setpoint.

In one form, the prediction module 220 is configured to predict an operational characteristic of the VAR process based on the process parameter and a remelt prediction model 222. In one form, the operational characteristic of the VAR process includes, but is not limited to a furnace ram position. In one form, the process parameters used to predict the operational characteristic of the VAR process may include, but is not limited to, a melt marker location, a weight of the electrode, a location of the lower surface of the electrode, an arc region, a height of the ingot melt, etc. In one form, the prediction module 220 predicts the furnace ram position of the VAR process relative to a melt marker location. In one form, the remelt prediction model 222 predicts the operational characteristic of the VAR process by inputting the process parameters into a multi-variate regression-based equation/model.

As an example, the remelt prediction model 222 is configured to predict a furnace ram position of the VAR process, as the operational characteristic, based on the process parameters. Specifically, the remelt prediction model 222 obtains process parameters associated with previous VAR processes, such as furnace ram positions during previous power adjustment phases in which the electric power was ramped down to zero, and executes a regression routine to calculate a predicted furnace ram position of the electrode 102. In one form, each of the previous power adjustment phases is ramped down to zero relative to the melt marker location and/or the melt marker condition being satisfied. Accordingly, the remelt prediction model 222 determines/updates coefficients utilized to predict the furnace ram position at various times in addition to predicting the furnace ram position. It should be understood that the remelt prediction model 222 may predict other operational characteristics based on the process parameters and is not limited to the examples provided herein. In one form, the VAR monitoring system 200 is further configured to determine whether the predicted operational characteristic of the VAR process satisfies a predetermined operational condition. The predetermined operation condition is satisfied when the operational characteristic corresponds to a numerical or qualitative value that, for example, indicates the operational characteristic is greater than or equal to (or less than or equal to) a predetermined threshold value, within a predetermined numerical tolerance range, and/or corresponds to a predetermined qualitative value (e.g., the current furnace ram position is at a predetermined threshold value). As an example, the VAR monitoring system 200 determines if the predicted furnace ram position corresponds to the current furnace ram position. In one form, the VAR monitoring system 200 may broadcast, based on the predicted operational characteristic of the VAR process, a notification to the primary VAR controller 130 to initiate the power adjustment phase to ramp down the electric power. As an example, the VAR monitoring system 200 may broadcast a command to initiate the power adjustment phase if the predicted furnace ram position corresponds to the current furnace ram position.

Figure 5:
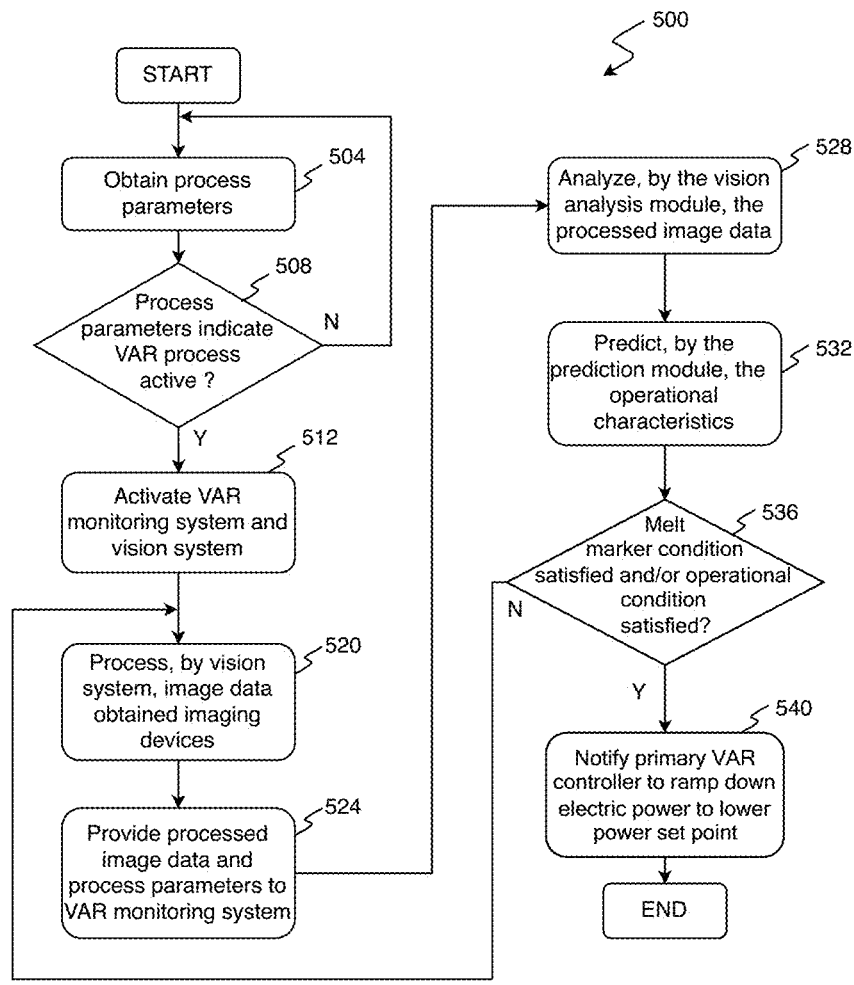
FIG. 5 is a flowchart of an example control routine in accordance with the teachings of the present disclosure.

Referring to FIG. 5, a flowchart illustrating an example routine 500 for performing the VAR process is shown. At 504, the process parameter controller 150 obtains the process parameters from the furnace 100. At 508, the process parameter controller 150 determines whether the process parameters indicate that the VAR process is active. If the process parameters indicate the VAR process is active, the routine 500 proceeds to 512. Otherwise, the routine 500 returns to 504 until the VAR process becomes active.

At 512, the process parameter controller 150 activates the VAR monitoring system 200 and the vision system 300. At 520, the vision system 300 processes the image data obtained by the imaging devices 302. At 524, the vision system 300 provides the processed image data to the VAR monitoring system 200, and the process parameter controller 150 provides the process parameters to the VAR monitoring system 200.

At 528, the vision analysis module 210 analyzes the processed image data to detect melt markers, as described above. At 532, the prediction module 220 predicts the operational characteristics of the VAR process based on the process parameters, as described above. At 536, the VAR monitoring system 200 determines whether the vision analysis module 210 determines whether the melt markers satisfy a predetermined melt marker condition or whether the predicted operational characteristic satisfies the predetermined operational condition (e.g., the furnace ram position corresponds to a current furnace ram position). If the melt marker does not satisfy the predetermined melt marker condition and the operational characteristic is not satisfied at 536, the routine 500 proceeds to 520. If the melt marker does satisfy the predetermined melt marker condition, the operational characteristic is satisfied at 536 or a combination thereof, the routine 500 proceeds to 540, where the VAR monitoring system 200 notifies the primary VAR controller 130 to ramp down the electric power from the steady state value to a lower power setpoint. For example, if the melt marker does satisfy the predetermined melt marker condition and the operational characteristic is satisfied, then the VAR monitoring system 200 notifies the primary VAR controller 130 to ramp down the electric power from the steady state value to a lower power setpoint.

The routine 500 is just one example of a monitoring routine for the control system of the present disclosure, and other routines may be employed. For example, in one variation, in lieu of issuing a notification to the primary VAR controller 130, the VAR monitoring system 200 may issue a notification to a technician in the control room 320 to have the technician begin the power adjustment phase.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control system for a vacuum arc remelting (VAR) process, the control system comprising:
    a vision system including an imaging device, wherein the imaging device is configured to capture one or more images of an electrode within a vacuum chamber of the VAR process; and
    a VAR monitoring system configured to determine a power adjustment phase of the VAR process based on the one or more images from the vision system, wherein:
    the VAR monitoring system includes:
        a vision analysis module configured to, by a processor, analyze the one or more images from the vision system to detect a pin, a slot or a combination thereof of a melt marker based on a remelt image process model,
    the VAR monitoring system is configured to initiate the power adjustment phase by a VAR controller in response to the pin, the slot, or the combination thereof of the melt marker satisfying a predetermined melt marker condition.

2. The control system of claim 1, wherein the VAR monitoring system is configured to determine the power adjustment phase further based on a process parameter, and wherein the process parameter includes a heat number, an electrode weight, a crucible identification, a furnace number, a furnace current, a furnace voltage, a furnace ram position, or a combination thereof.

3. The control system of claim 1, wherein, for a respective image, the vision analysis module is configured to select a section of the respective image to be analyzed by the remelt image process model.

4. The control system of claim 1, wherein the vision system and the VAR monitoring system begins operating in response to a furnace ram position being at a defined position, a power input to a furnace of the VAR process being greater than a power setpoint, or a combination thereof.

5. The control system of claim 1 further comprising a prediction module configured to, by a processor, predict a furnace ram position of the VAR process that is associated with the power adjustment phase based on a process parameter and a remelt prediction model, wherein the VAR monitoring system is configured to initiate the power adjustment phase in response to the furnace ram position of the VAR process satisfying a predetermined operational condition, and wherein the remelt prediction model is configured to predict the furnace ram position of the VAR process relative to a melt marker location.

6. The control system of claim 1 further comprising a primary VAR controller configured to control power to a furnace of the VAR process, wherein the VAR monitoring system is further configured to initiate the power adjustment phase by notifying the primary VAR controller to begin a power ramp down.

7. The control sytem of claim 1, wherein the remelt image process model includes a deep convolutional neural network.

8. A method for controlling a vacuum arc remelting (VAR) process, the method comprising:
    obtaining one or more images of an electrode within a vacuum chamber;
    analyzing the one or more images to detect a pin, a slot, or a combination thereof of a melt marker of the one or more images based on a remelt image process model;
    determining a power adjustment phase of a VAR process based on the one or more images; and
    initiating, by a VAR controller, the power adjustment phase in response to the pin, the slot, or the combination thereof of the melt marker satisfying a predetermined melt marker condition.

9. The method of claim 8, wherein the determining the power adjustment phase of the VAR process is further based on a process parameter, and wherein the process parameter includes a heat number, an electrode weight, a crucible identification, a furnace number, a furnace current, a furnace voltage, a furnace ram position, or a combination thereof.

10. The method of claim 8 further comprising selecting a section of a respective image to be analyzed by the remelt image process model.

11. The method of claim 8 further comprising operating, in response to a furnace ram position being at a defined position, a power input to a furnace of the VAR process being greater than a power setpoint, or a combination thereof.

12. The method of claim 8 further comprising predicting a furnace ram position of the VAR process relative to a melt marker location.

13. The method of claim 8, wherein initiating the power adjustment phase further includes beginning a power ramp down routine.

14. The method of claim 8 further comprising predicting a furnace ram position of the VAR process based on a process parameter and a remelt prediction model, wherein the initiating the power adjustment phase is in response to the furnace ram position of the VAR process satisfying a predetermined operational condition, and wherein the predetermined operational condition includes determining whether a predicted furnace ram position of the electrode corresponds to a current furnace ram position.

15. The method of claim 10, wherein the remelt prediction model further comprises predicting, using a regression routine, the operational condition based on one or more previously obtained process parameters associated with one or more previous VAR processes.

16. The method of claim 8, wherein the remelt image process model further comprises performing one or more image-processing routines to detect the pin, the slot, or the combination thereof of the melt marker using a deep convolutional neural network.

17. The method of claim 8, wherein the remelt image process model includes a deep convolutional neural network.

18. A system for controlling a vacuum arc remelting (VAR) process, the system comprising:
    a processor; and
    a nontransitory computer-readable medium including instructions that are executable by the processor, wherein the instructions include:
        obtaining one or more images of an electrode within a vacuum chamber;
        analyzing the one or more images to detect a melt marker of the one or more images based on a remelt image process model that includes a deep convolutional neural network;
        determining a power adjustment phase of the VAR process based on the one or more images and a process parameter;
        predicting an operational characteristic of the VAR process based on the process parameter and a remelt prediction model; and
        initiating, by a VAR controller, the power adjustment phase in response to the melt marker satisfying a predetermined melt marker condition, the operational characteristic of the VAR process satisfying a predetermined operational condition, or a combination thereof.

19. The system of claim 18, wherein the remelt prediction model further comprises instructions for predicting, using a regression routine, the operational characteristic based on one or more previously obtained process parameters associated with one or more previous VAR processes.

* * * * *